(12) United States Patent
Acharya et al.

(10) Patent No.: US 8,035,528 B2
(45) Date of Patent: Oct. 11, 2011

(54) FAST DETECTION OF CONTACT STATUS WITH AC WETTING VOLTAGE USING RATIOMETRIC APPROACH

(75) Inventors: Parag Vishwanath Acharya, Hyderabad (IN); Fred Henry Boettner, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 386 days.

(21) Appl. No.: 12/463,554

(22) Filed: May 11, 2009

(65) Prior Publication Data
US 2010/0283512 A1 Nov. 11, 2010

(51) Int. Cl.
*G08B 21/00* (2006.01)
(52) U.S. Cl. .......................... 340/644; 340/635; 340/657

(58) Field of Classification Search .................. 340/635, 340/644, 645, 646, 657–663; 324/120, 438
See application file for complete search history.

(56) References Cited

U.S. PATENT DOCUMENTS
5,929,663 A 7/1999 Dougherty

*Primary Examiner* — Van T. Trieu
(74) *Attorney, Agent, or Firm* — Hoffman Warnick LLC; Ernest G. Cusick (57) ABSTRACT

Fast detection of contact status with an AC wetting voltage using a ratiometric approach is described herein. In one embodiment, a voltage source wets the contact with a wetting voltage. A contact voltage monitor receives voltage obtained from the contact and converts the voltage to a first frequency output. A wetting voltage monitor receives wetting voltage provided from the voltage source to the contact and converts the sensed wetting voltage to a second frequency output. A processor generates a ratio between the first frequency output and the second frequency output and determines the status of the contact and the field wires associated with the contact in accordance with the generated ratio.

20 Claims, 5 Drawing Sheets

FAST DETECTION OF CONTACT STATUS WITH AC WETTING VOLTAGE USING RATIOMETRIC APPROACH

BACKGROUND OF THE INVENTION

The present invention relates generally to controlling an industrial process and more particularly to using a ratiometric approach for the fast detection of the status of contacts used in an industrial process that are wetted with an alternating current (AC) voltage.

A power generation plant is one example of an industrial process in which a large number of electrical contacts (e.g., switches and relays) are used. The electrical contacts in a power generation plant can be used to control a wide variety of equipment such as motors, pumps, solenoids and lights. In this scenario, a control system needs to monitor the electrical contacts within the power plant to determine their status in order to ensure that certain functions associated with the process are being performed. In particular, the control system determines whether the electrical contacts are on or off, or whether there is a fault near the contacts such as open field wires or shorted field wires that affect the ability of the contacts to perform their intended function. One approach that a control system uses to monitor the status of the electrical contacts is to send an electrical voltage (e.g., a direct current voltage (DC) or an alternating current (AC) voltage) to the contacts in the field and determine whether this voltage can be detected. The voltage, which is provided to the electrical contacts for detection, is known as a wetting voltage. If the wetting voltage levels are high, galvanic isolation in the circuits is used as a safety measure while detecting the existence of voltage. Detecting the voltage is an indication that the electrical contact is on or off. The control system then stamps the time at which this event (e.g., electrical contact on or off) occurred, so if necessary an operator can use this information at a later date in the repair and diagnostics of the power generation equipment. The time stamping of events associated with the electrical events is known as sequence of events (SOE).

BRIEF DESCRIPTION OF THE INVENTION

In one aspect of the present invention, a method of detecting a status of a contact and field wires associated with the contact is disclosed. The method comprises: wetting the contact with an AC wetting voltage; sensing the voltage at the contact; sensing the AC wetting voltage provided to the contact; converting the sensed voltage at the contact to a first frequency output; converting the sensed AC wetting voltage to a second frequency output; generating a ratio between the first frequency output and the second frequency output for the predetermined time interval; and determining the status of the contact and field wires in accordance with the generated ratio.

In a second aspect of the present invention, a control system for detecting a status of a contact and field wires associated with the contact is disclosed. In this embodiment, the control system comprises a voltage source that wets the contact with a wetting voltage. A contact voltage monitor receives voltage obtained from the contact and converts the voltage to a first frequency output. A wetting voltage monitor receives wetting voltage provided from the voltage source to the contact and converts the sensed wetting voltage to a second frequency output. A processor generates a ratio between the first frequency output and the second frequency output for the predetermined time interval and determines the status of the contact and the field wires in accordance with the generated ratio.

DETAILED DESCRIPTION OF THE INVENTION

Figure 1:
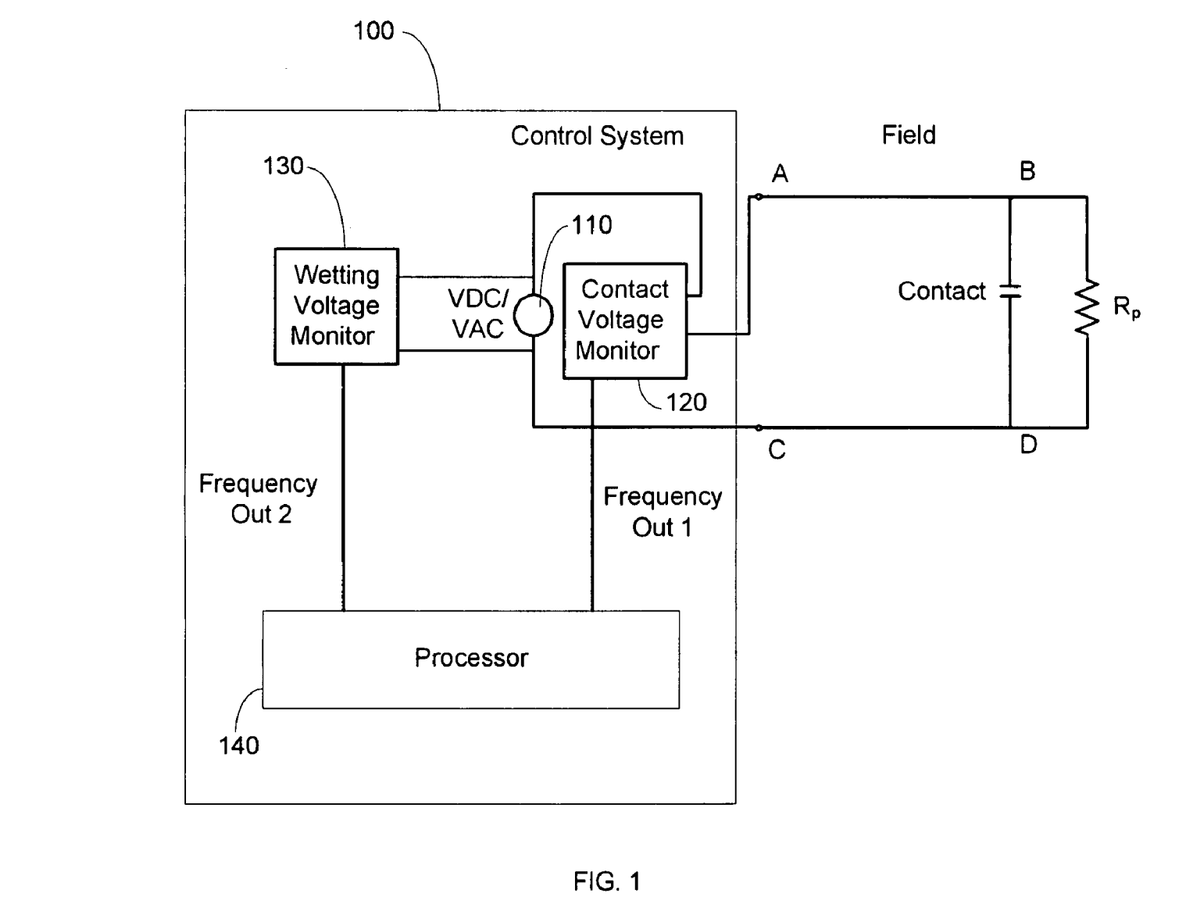
FIG. 1 is a schematic diagram of a control system used to detect the status of an electric contact used in an industrial process according to one embodiment of the present invention.

FIG. 1 is a schematic diagram of a control system 100 used to detect the status of an electric contact (hereinafter "contact") and field wires associated with the contact as used in an industrial process according to one embodiment of the present invention. As used herein, a contact is an electrical component for joining electric circuits together or breaking the circuits by interrupting or diverting the current from one conductor to another. Examples of contacts include electrical components such as switches, relays, terminals and connectors. One example of an industrial process in which embodiments of the present invention is suitable for use is with a power generation plant where a large number of contacts are used to control a wide variety of equipment such as motors, pumps, solenoids and lights. Those skilled in the art will recognize that embodiments of the present invention are applicable to other industrial processes where contacts are used to control the operation of process equipment and where it is desirable to ascertain the status of such contacts for the purpose of sequence of events (SOE) analysis.

As mentioned above, the status of contacts is typically monitored by sending an electrical voltage such as DC voltage or AC voltage in the field to the contacts and then determining whether this voltage can be detected. A voltage applied to a contact in order to detect its status is known in the art as a wetting voltage. If the wetting voltage levels are high, galvanic isolation in the circuits is used as a safety measure while detecting the existence of voltage. Detecting an AC wetting voltage is problematic because the instantaneous changing nature of AC voltage waveforms makes it difficult to quickly detect the exact time when the status of the contact changed. In particular, conventional approaches use a rectifier to convert the AC wetting voltage to a DC voltage and a filter capacitor to flatten out the voltage to facilitate detection. The flattened voltage is then converted to a digital signal so that a processor can interpret its status. Flattening out the voltage with the filter capacitor slows the response time in which a determination can be made with respect to the status of the contact. For complex processes, a slow response time is not conducive to obtaining accurate detection of contact status SOE data in a desirable time period (e.g., ±2 to 3 milliseconds) for an AC wetting voltage that ranges from about 60 V to about 300 V AC and ±1 milliseconds for a DC wetting voltage that ranges from about 10 V to about 300 V DC.

Figure 3:
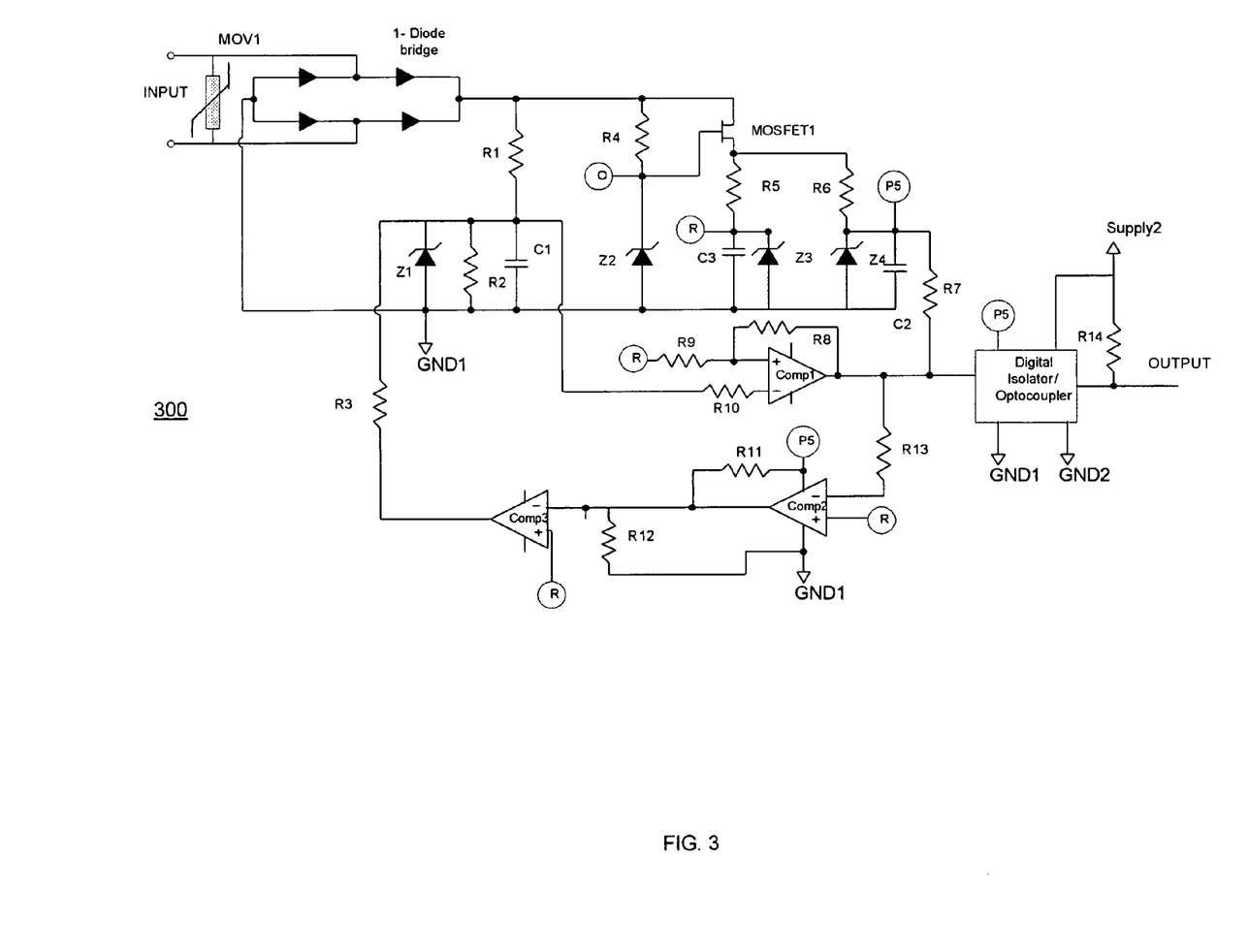
FIG. 3 is a schematic circuit diagram of a loop powered isolated voltage-to-frequency converter that may be used as the contact voltage monitor and wetting voltage monitor shown in FIGS. 1-2 according to one embodiment of the present invention.
Figure 4:
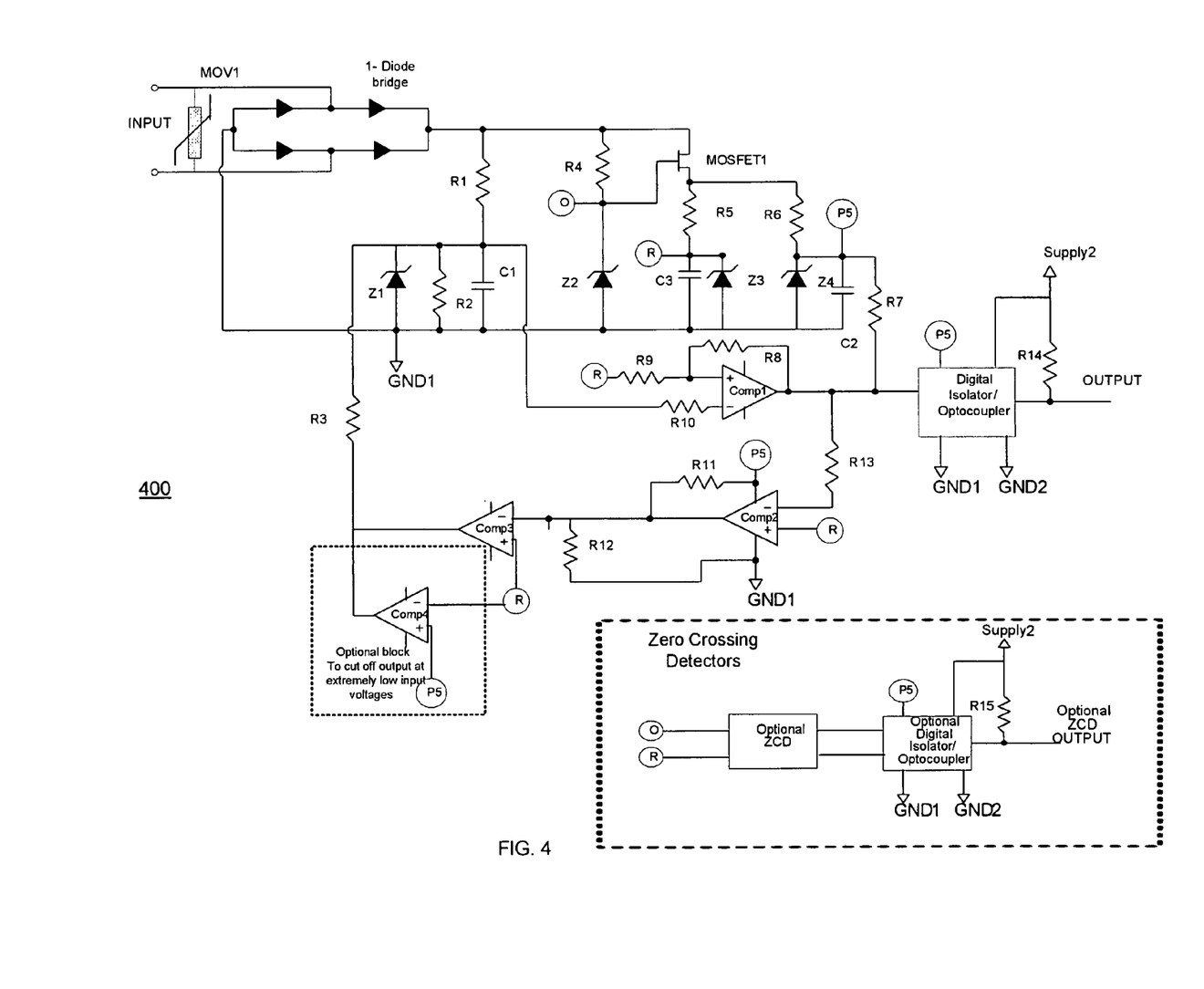
FIG. 4 is a schematic circuit diagram of a first alternative embodiment of the loop powered isolated voltage-to-frequency converter shown in FIG. 3.

Embodiments of the present invention are able to accurately detect contact status SOE data that is in the range of ±2 to 3 milliseconds for an AC wetting voltage that ranges from about 60 V to about 300 V AC and ±1 milliseconds for a DC wetting voltage that ranges from about 10 V to about 300 V DC by directly converting input voltage to frequency using a voltage-to-frequency converter in combination with a ratiometric analysis described below to extrapolate the status from the frequency information or by using a loop powered isolated voltage-to-frequency converter illustrated in FIGS. 3-4 with the ratiometric analysis. Note that if the loop powered voltage-to-frequency converter of FIGS. 3-4 is not used, then in the case of galvanically isolated circuits, the power to the voltage-to-frequency converter needs to be isolated from the processor system, which is costly, complicated and occupies more space on the board.

Referring back to FIG. 1, control system 100 includes a voltage source 110 that is configured to supply an AC wetting voltage or a DC wetting voltage to a Contact located in the field away from the system. In one embodiment, voltage source 110 is configured to provide the field including the contact and a resistor $R_p$ that is parallel with the Contact with an AC wetting voltage that ranges from about 60 V to about 300 V AC and a DC wetting voltage that ranges from about 10 V to about 300 V DC. In one embodiment, the Contact and resistor $R_p$ are remote from control system 100. Those skilled in the art will recognize that the distance of the field can vary depending on the particular process. For the power plant scenario, it is conceivable that the contact can be located as far as 500 meters away from control system 100 and as close as several meters.

Control system 100 further includes a contact voltage monitor 120 that receives voltage obtained from the Contact and converts the voltage to a first frequency output referred to as Frequency Out 1. As shown in FIG. 1, control system 100 further includes a wetting voltage monitor 130 that receives wetting voltage provided from voltage source 110 to the Contact and converts the sensed wetting voltage to a second frequency output referred to as Frequency Out 2. In one embodiment, contact voltage monitor 120 and wetting voltage monitor 130 are both isolated voltage-to-frequency converters (e.g., voltage controlled oscillators) that convert voltage to frequency which is used by a processor 140 for determination of whether one of three status conditions has been sensed. In this embodiment, the status conditions include that the contact is closed, the contact is open, or a field wire located about the contact is faulty (e.g., open between points A and B or open between points C and D). As will be explained below, processor 120 counts the frequency pulses of Frequency Out 1 and Frequency Out 2 at a predetermined time interval, and generates a ratio between Frequency Out 1 and Frequency Out 2. The ratio between Frequency Out 1 and Frequency Out 2 corresponds to one of these status conditions.

Embodiments of the present invention are able to ascertain such conditions because contact voltage monitor 120 monitors the varying conditions of the Contact in the field by monitoring the input voltage at the Contact, while wetting voltage monitor 130 monitors the wetting voltage provided by voltage source 110 to the Contact in the field. The monitoring performed by contact voltage monitor 120 and wetting voltage monitor 130 will vary depending on whether an AC wetting voltage or DC wetting voltage is applied to the Contact.

If the input is an AC wetting voltage, then the outputs (i.e., Frequency Out 1 and Frequency Out 2) have variable frequency variable duty cycle pulses. That is, in the first positive half cycle of an AC wetting voltage input, the frequency increases until 90 degrees. From 90 to 180 degrees, the frequency reduces and it is the mirror image of the frequency output from 0 to 90 degrees. This cycle continues by repeating itself. A typical voltage-to-frequency converter (e.g., a voltage controlled oscillator) has a bridge rectifier at the input, which converts all negative cycles to positive. For AC wetting voltages, contact voltage monitor 120 and wetting voltage monitor 130 monitors the Frequency Out 1 and Frequency Out 2 signals every 1 millisecond so that processor 140 can determine the ratio of Frequency Out 1 to Frequency Out 2.

Based on the calculated value of the ratio, the input condition is detected by processor 140 in the following manner. When the wires from the Contact to the input/output (I/O) board of control system 100 are open, the voltage at contact voltage monitor 120 is zero. Therefore, the Frequency Out 1 count in 1 millisecond is zero, which translates to a ratio of Frequency Out 1 to Frequency Out 2 that is zero. When the Contact is closed, the voltage at contact voltage monitor 120 is the same as or close to the input voltage provided by voltage source 110. Therefore, the Frequency Out 1 count in 1 millisecond is equal to or close to the Frequency Out 2 count, which translates to a ratio of Frequency Out 1 to Frequency Out 2 that is about one. When the Contact is open, the voltage at contact voltage monitor 120 is in between zero and the input voltage provided by voltage source 110 based on the value of the resistor $R_p$. The threshold for determining whether the Contact is open can be set per a predetermined design requirement. In one embodiment, the threshold for determining whether the Contact is open is about 0.5. Therefore, the Frequency Out 1 count in 1 millisecond is about half of the Frequency Out 2 count, which translates to a ratio of Frequency Out 1 to Frequency Out 2 that is about 0.5. Note that the values of the above-noted ratios remain the same or within a narrow range for the entire wide input voltage range as contact voltage monitor 120 and wetting voltage monitor 130 draw almost constant current, independent of the input voltage provided by voltage source 110.

For DC wetting voltage inputs, determining the ratio in a millisecond is considered directly to identify the input condition but for AC wetting voltage inputs, voltage inputs are monitored for three consecutive milliseconds. If it is the same for three times then three milliseconds are subtracted from the current timing and then processor 140 generates a time stamp indicating that the contact status is a SOE. As a result, processor 140 in one embodiment can log the SOE in a manner that indicates the current timing (e.g., "Present time"–3 milliseconds). Note that the timing of the ratio can be done with two repeated readings as well. In that case, it is monitored for two consecutive milliseconds and if it is the same for two times, then 2 milliseconds are subtracted from the current timing so that processor 140 in one embodiment can log the SOE accordingly (e.g., "Present time"–2 milliseconds). Note that near zero crossing, the ratio cannot be as per the conditional requirements but instead is close to either zero or one irrespective of the input voltage level or input condition. Therefore, 2 to 3 times monitoring gives confirmed correct results. That is, if the status is monitored for 3 milliseconds, then the accuracy of the SOE would be closed to +/−3 milliseconds and if it is done for 2 milliseconds, then the accuracy of the SOE would be +/−2 milliseconds.

Although the above description applies to an input voltage that is an AC wetting voltage, system 100 and the other embodiments of the present invention can monitor the status of the Contact that is fed a DC wetting voltage. For example, if the input is a DC wetting voltage, then the outputs (i.e., Frequency Out 1 and Frequency Out 2) have nearly constant frequencies corresponding to the input voltages. That is, the frequency outputs of contact voltage monitor 120 and wetting voltage monitor 130 vary linearly if the DC input amplitude varies. In other words, the output frequency is directly proportional to the amplitude of input DC voltage. In this embodiment, Frequency Out 1 and Frequency Out 2 are counted by processor 140 for the fixed predetermined time interval. Therefore, Frequency Out 2 has nearly constant frequency count for a constant wetting voltage provided to the Contact irrespective of the Contact and field wire status. Thus, based on the Contact and field wire status, input voltage to contact voltage monitor 120 is different and so is the Frequency Out 1 count. In this embodiment, the input condition is detected by processor 140 in the following manner. For the field wire open condition, it is close to zero; for the contact closed condition, it is very near to the Frequency Out 2 count and for the Contact open condition, it has a frequency output between zero and Frequency Out 2 count. In the case of a field wire being opened, the ratio of Frequency Out 1 count to the Frequency Out 2 count is near zero. For the contact closed condition, the ratio is near 1 and for the contact open condition, the ratio of Frequency Out 1 count to the Frequency Out 2 count can be between zero and 1 based on the value of resistor Rp.

Figure 2:
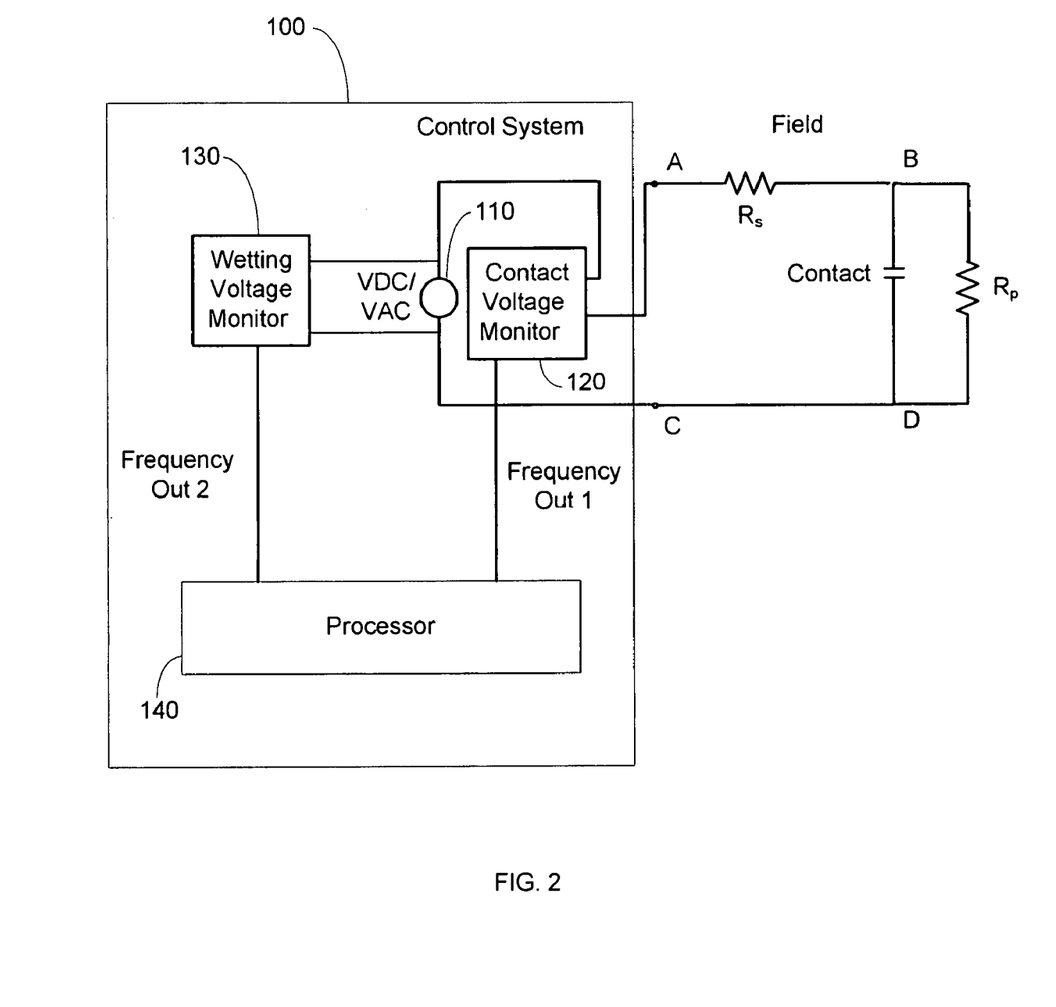
FIG. 2 is a schematic diagram of an alternative embodiment of the control system depicted in FIG. 1.

FIG. 2 is a schematic diagram of control system 100 used in an alternative embodiment to detect an additional contact status condition. As mentioned above, control system 100 in FIG. 1 is configured to detect status conditions that include that the contact is closed, the contact is open, or a field wire located about the contact is faulty (e.g., a open between points A and B or open between points C and D). In addition to these conditions, control system 100 in FIG. 2 can detect whether field wires are shorted to each other (e.g., A is shorted to C). These four conditions can be detected by adding a resistor $R_s$ that is in series with the Contact. In this embodiment, the status conditions such as contact closed, contact open, and faulty field wire are determined in the same manner as described above with respect to FIG. 1. With regard to detecting whether field wires are shorted, a determination is made as follows. Instead of the three values of ratio, there are four values of ratio in this case. When field wires are shorted (e.g., A is shorted to C), the ratio of the Frequency Out 1 count to the Frequency Out 2 count is nearly one because the voltage inputs to contact voltage monitor 120 and wetting voltage monitor 130 are near to the VDC/VAC source amplitude. When field wires are open, the ratio is near zero, and the ratios for a contact closed condition and a contact open condition vary based on the values of resistor Rs and resistor Rp. In one embodiment, the threshold for determining whether the Contact is open is about 0.33 and the threshold for determining whether the contact is closed is about 0.66. Those skilled in the art will recognize that these values are not limiting and are only provided as example threshold values. Furthermore, those skilled in the art will recognize that this new condition detected by the embodiment in FIG. 2 can be extended to more conditions such as the wire being shorted to ground. Therefore, embodiments of the present invention are not meant to be limited to these stated conditions.

As mentioned above, in one embodiment, contact voltage monitor 120 and wetting voltage monitor 130 can each be a conventional voltage-to-frequency converter (e.g., a voltage controlled oscillator). Those skilled in the art will recognize that because there is a restriction on the wetting voltage, the input voltage range cannot be as wide as about 60 V to about 300 V AC RMS for AC wetting voltage and about 10 V to about 300 V DC for DC wetting voltage. In one embodiment, if the voltage range needs to be widened, then the voltage-to-frequency converter can be used along with a voltage attenuator circuit like a resistor divider. An issue with using the conventional voltage-to-frequency converter along with the voltage divider circuit is that there is a different (non-constant) input current with respect to the input voltage amplitude. This creates problems in interpreting the ratios as the voltage input from the Contact is dependent on the input impedance of the voltage-to-frequency converter circuit and the values of resistors in the voltage divider. This makes it very difficult to extrapolate the input condition based on these outputs.

However, a specially designed loop powered isolated voltage-to-frequency converter as provided herein can be implemented to perform the above described functionalities associated with contact voltage monitor 120 and wetting voltage monitor 130. FIG. 3 is a schematic circuit diagram of a loop powered isolated voltage-to-frequency converter 300 that may be used according to one embodiment of the present invention. As shown in FIG. 3, Input terminals receive the wetting voltage (AC/DC) input under measurement. A metal oxide varistor MOV1 protects the circuit from the voltage spikes. Protection from voltage spikes is especially useful when loop powered isolated voltage-to-frequency converter 300 is used as a sensing circuit for contact sensing because switching off the Contact can have a large voltage spike if there is an inductive load on the Contact. In one embodiment, MOV1 clamps the unwanted voltage spikes. A 1-Diode bridge rectifies the Input if it is an AC voltage. The advantage of having the 1-Diode bridge in case of a DC voltage is that loop powered isolated voltage-to-frequency converter 300 becomes polarity insensitive. Metal-oxide-semiconductor field-effect transistor MOSFET1, resistor R4, and Zener diode Z2 constitute a constant voltage source. Zener diode Z4 constitutes power supply for comparators Comp1, Comp2 and Comp3 as well as for a Digital Isolator/Optocoupler. Zener diode Z3 provides a reference. Supply 2 and GND2 are for the system side where the counter and processor 140 are present.

In operation, when voltage is present at the Input, the Output toggles between logically high and low with the frequency proportional to input voltage. Resistors R7, R8 and R9 decide the hysteresis of comparator Comp1. When the voltage appears across the Input terminal, the P5 (i.e., the power supply of comparators Comps 1-3 and the Digital Isolator/Opotocoupler) and R (i.e., the reference to the comparators Comps 1-3) reach their respective levels. Capacitor C1 starts charging through resistor R1. When capacitor C1 reaches to the specific voltage (e.g., R+0.5 hysteresis of Comp1), the comparator Comp 1 output turns low. This turns on the Digital Isolator/Opotocoupler and their output changes. Also, Comparator Comp 2 output turns high and Comp3 output turns low. This causes Capacitor C1 to start discharging through resistor R3. When it discharges to a specific voltage (e.g., to R−0.5 hysteresis of Comp1), Comparator Comp 1 output goes high. This results in Digital Isolator/Optocoupler changing its output state. Comparator Comp2 output goes low and Comparator Comp 3 output goes high, (all comparators are open collector output types) and capacitor C1 is again ready to charge and the cycle repeats. The charging time or on time is decided by value of resistor R1, resistor R7, resistor R8, resistor R9 and capacitor C1. The discharge time or off time is decided by resistor R7, resistor R8, resistor R9, resistor R3 and capacitor C1.

For very high resolution (e.g., output frequencies in the MHz range), fast Digital Isolator/Optocouplers as well as fast comparators can be used. In this case, the output of the Digital Isolator/Optocoupler is given to a counter. The pulses are counted and from the count, the input voltage can be calculated. As the input voltage increases, the output frequency also increases. For a DC voltage, there will be constant frequency output based on the amplitude of input voltage. For an AC voltage sine wave input, the output is a variable frequency-variable duty cycle type, which is similar to a pulse width modulation (PWM) type of output. That is, from 0 to 90 degrees the output frequency goes on increasing as the instantaneous voltage increases. In this case, the output frequency is the maximum at 90 degrees. From 90 till 180 degrees, frequency reduces in proportion with the instantaneous voltage. Then the cycle repeats itself.

One way of measuring and identifying an AC voltage with a loop powered isolated voltage-to-frequency converter 300 is to take 10 to 20 samples about one every 1 millisecond. In this embodiment, the rate of change of counts is obtained, the frequency count is converted to voltage, the voltage is squared, the mean is taken and then the square root is calculated.

An optional approach would be to implement zero crossing detectors (ZCD) and use the ZCD pulses to identify that the input voltage is AC. In another alternative embodiment, loop powered isolated voltage-to-frequency converter 300 can be implemented with another comparator Comp 4 that enables the handling of very low input voltages (e.g., less than 10 V DC) where the power supply P5 is not stabilized. FIG. 4 shows a loop powered isolated voltage-to-frequency converter 400 with each of the additional components associated with implementing the zero-crossing and the additional components associated with implementing the low input voltage embodiments with the loop powered isolated voltage-to-frequency converter 300 shown in FIG. 3.

Figure 5:
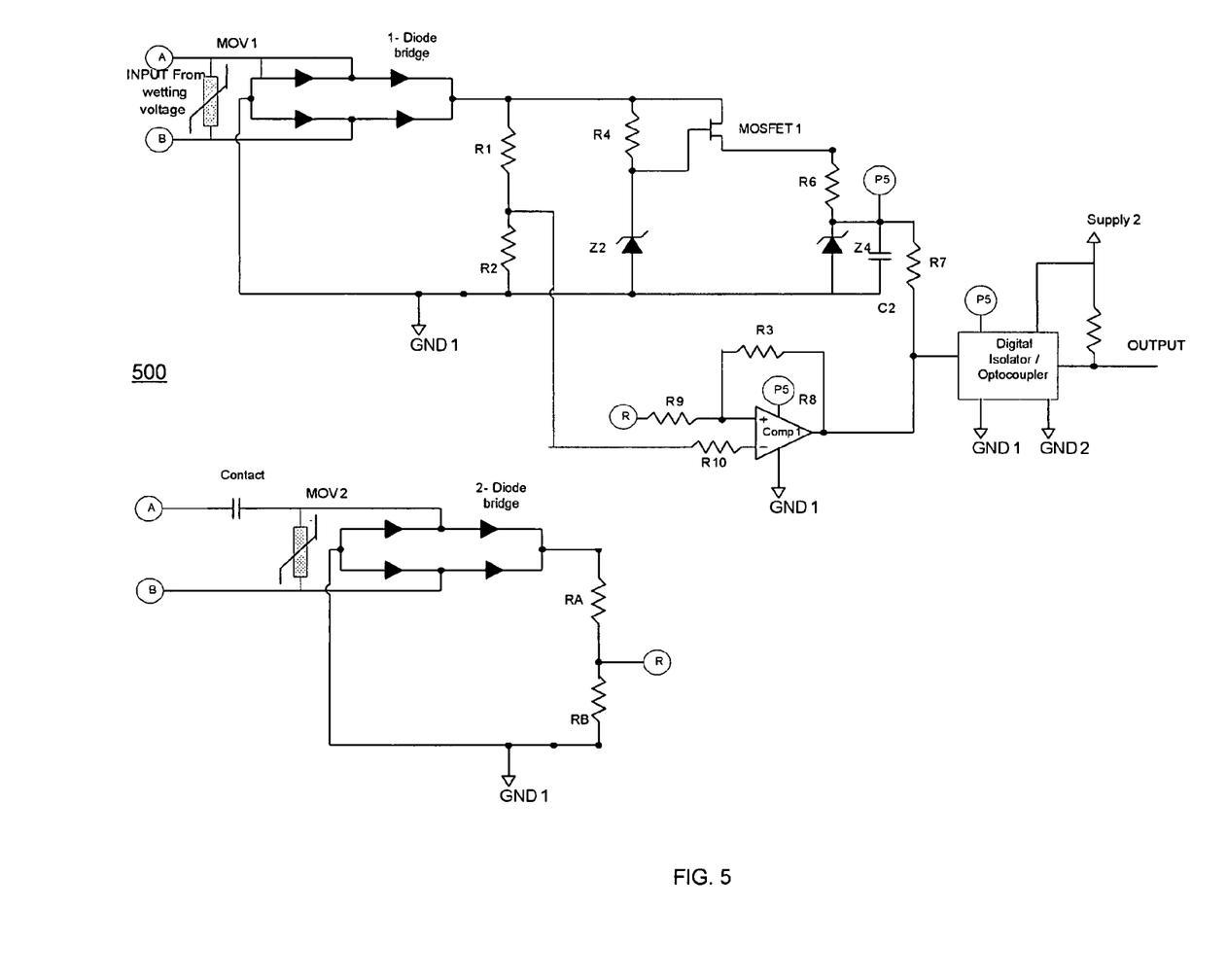
FIG. 5 is a schematic circuit diagram according to one embodiment of the present invention that is used to detect the status of an electric contact in an industrial process by comparing voltage and generating an isolated digital signal to a processor without converting input voltage to frequency.

Although preferred embodiments of the present invention use frequency ratios to determine the Contact status, it is within the scope of these embodiments to use voltage to determine the contact status. FIG. 5 shows a circuit 500 that can be used to perform the functions of the contact voltage monitor 120 and wetting voltage monitor 130. However, instead of generating frequency outputs, voltage outputs will be generated and compared by comparator Comp1. The digital logic high or low signal is generated based on the input voltage present or absent and then it is sent to processor 140 for determining contact status conditions. In this case, the circuit 500 uses the voltage ratios to identify the contact status. When the wetting voltage is present at Input, the 1-Diode bridge has an output which generates P5 (i.e., the power supply of comparator Comp1). When the Contact is on, the voltage is present at 2-Diode bridge input, which generates the reference R for the comparator Comp1. The comparator Comp1 output is logic high or low based on the values of resistors R1, R2, RA, RB, R3 and R9. When the Contact is off, the reference R goes to zero and the comparator Comp1 output toggles. This circuit can detect only the contact on-off conditions and not the field wire status. In one or more embodiments, it may be desirable to use more references with different resistor dividers generated that are fed to different comparators along with the voltage at the junction of resistors R1 and R2. Based on the outputs of all the comparators more input conditions can be detected. In other embodiments, the field wire conditions can be identified using series and parallel resistors with the Contact and more comparators in the voltage comparing circuit.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A method of detecting a status of a contact and field wires associated with the contact, the method comprising:
   wetting the contact with an AC wetting voltage;
   sensing the voltage at the contact;
   sensing the AC wetting voltage provided to the contact;
   converting the sensed voltage at the contact to a first frequency output;
   converting the sensed AC wetting voltage to a second frequency output;
   generating a ratio between the first frequency output and the second frequency output; and
   determining the status of the contact and field wires in accordance with the generated ratio.

2. The method according to claim 1, further comprising counting frequency pulses associated with the first frequency output and the second frequency output in a predetermined time interval.

3. The method according to claim 2, wherein the generating of the ratio between the first frequency output and the second frequency output comprises generating a ratio between the first frequency output pulse count and the second frequency output pulse count.

4. The method according to claim 2, wherein the predetermined time interval ranges from about 1 millisecond to about 3 milliseconds.

5. The method according to claim 4, wherein the generating of the ratio between the first frequency output and the second frequency output comprises generating the ratio within the predetermined time interval.

6. The method according to claim 1, wherein the status is selected from the group consisting of contact closed, contact open, field wires open and field wires shorted.

7. The method according to claim 6, wherein each status corresponds to a predetermined threshold ratio indicative of that condition.

8. A control system for detecting a status of a contact and field wires associated with the contact, the system comprising:
   a voltage source that wets the contact with a wetting voltage;
   a contact voltage monitor that receives voltage obtained from the contact and converts the voltage to a first frequency output;
   a wetting voltage monitor that receives wetting voltage provided from the voltage source to the contact and converts the sensed wetting voltage to a second frequency output; and
   a processor that generates a ratio between the first frequency output and the second frequency output and determines the status of the contact and field wires in accordance with the generated ratio.

9. The control system according to claim 8, wherein the processor counts frequency pulses associated with the first frequency output and the second frequency output in a predetermined time interval.

10. The control system according to claim 9, wherein the processor generates a ratio between the first frequency output pulse count and the second frequency output pulse count.

11. The control system according to claim 9, wherein the predetermined time interval ranges from about 1 millisecond to about 3 milliseconds.

12. The control system according to claim 8, wherein the status is selected from the group consisting of contact closed, contact open, field wires open and field wires shorted.

13. The control system according to claim 12, wherein each status corresponds to a predetermined threshold ratio indicative of that condition.

14. The control system according to claim 8, wherein the contact voltage monitor and wetting voltage monitor comprise a loop powered isolated voltage-to-frequency converter.

15. The control system according to claim 14, wherein the loop powered isolated voltage-to-frequency converter receives input voltages that range from about 10V DC to about 250V DC and about 60V to about 265 V50/60 Hz AC RMS.

16. The control system according to claim 14, wherein the loop powered isolated voltage-to-frequency converter draws near to constant current throughout the input range.

17. The control system according to claim 14, wherein the loop powered isolated voltage-to-frequency converter converts an input voltage to an isolated digital frequency that is proportional to the input voltage.

18. The control system according to claim 14, wherein the loop powered isolated voltage-to-frequency converter galvanically isolates the wetting voltage from the processor.

19. The control system according to claim 8, wherein the contact voltage monitor and wetting voltage monitor are configured to generate respective voltage outputs.

20. The control system according to claim 19, wherein the processor is configured to determine the status of the contact in accordance with the generated respective voltage outputs.

* * * * *